US007024159B2

(12) United States Patent
Exler

(10) Patent No.: US 7,024,159 B2
(45) Date of Patent: Apr. 4, 2006

(54) EXTENSION SET FOR A DVB-T-RECEIVER

(75) Inventor: Ralf Exler, Kolbermoor (DE)

(73) Assignee: Kathrein-Werke KG, Rosenheim (DE)

( * ) Notice: Subject to any disclaimer, the term of this patent is extended or adjusted under 35 U.S.C. 154(b) by 156 days.

(21) Appl. No.: 10/476,003

(22) PCT Filed: Mar. 21, 2002

(86) PCT No.: PCT/EP02/03197

§ 371 (c)(1),
(2), (4) Date: Oct. 27, 2003

(87) PCT Pub. No.: WO02/089361

PCT Pub. Date: Nov. 7, 2002

(65) Prior Publication Data

US 2004/0119652 A1 Jun. 24, 2004

(30) Foreign Application Priority Data

Apr. 26, 2001 (DE) .......................... 201 07 231 U

(51) Int. Cl.
*H04B 3/36* (2006.01)

(52) U.S. Cl. .............................. 455/15; 455/7; 455/22

(58) Field of Classification Search ................ 343/702, 343/850, 853; 455/15, 7, 20, 22, 276.1; 725/68, 725/80, 81, 105, 118; 275/68, 80, 81, 105, 275/118
See application file for complete search history.

(56) References Cited

U.S. PATENT DOCUMENTS

| | | | | |
|---|---|---|---|---|
| 5,937,332 | A | 8/1999 | Karabinis | 455/12.1 |
| 2002/0147978 | A1* | 10/2002 | Dolgonos et al. | 725/62 |
| 2004/0110469 | A1* | 6/2004 | Judd et al. | 455/15 |

FOREIGN PATENT DOCUMENTS

| | | |
|---|---|---|
| DE | 299 14 048 | 12/1999 |
| DE | 200 09 939 | 10/2000 |
| EP | 0 772 310 | 5/1997 |
| EP | 1 076 376 | 2/2001 |
| WO | WO 00/72596 | 11/2000 |
| WO | WO 01/45303 | 6/2001 |

* cited by examiner

*Primary Examiner*—Hoang V. Nguyen
(74) *Attorney, Agent, or Firm*—Nixon & Vanderhye P.C.

(57) ABSTRACT

The invention relates to an improved extension device for a DVB-T-receiver characteristed in that it comprises an indoor-repeater enabling the received an/or digitised signals supplied to be emitted or are emitted in a non-converted manner via an antenna device associated with the repeater or arranged in the repeater or connected thereto.

12 Claims, 1 Drawing Sheet

EXTENSION SET FOR A DVB-T-RECEIVER

This application is the U.S. national phase of international application PCT/EP02/03197, filed Mar. 21, 2002, which designated the U.S.

FIELD

The technology herein relates to an extension set for a receiver, in particular a DVB-T receiver.

BACKGROUND AND SUMMARY

As is known, a DVB-T receiver is a receiver or a DVBT digital television (IDTV) for receiving terrestrially broadcast digitized television programs (D=digital, V=video, B=broadcasting, T=terrestrial).

Even with devices such as these, it is by no means ruled out that reception at the desired installation location of the receiver may possibly be poorer than elsewhere in the room.

Therefore, it has already been proposed in accordance with DE 299 14 048.2 to provide an extension set particularly for a DVB-T receiver for receiving terrestrially broadcast digitized television programs. Such an extension set may comprise an antenna pedestal device provided with an antenna connection cable. This extension set can be connected to a conventional DVB-T receiver. In such case, an antenna plugged onto the receiver can then be withdrawn from the receiver and connected to the extension set. It is thus not necessary to purchase a new antenna. This enables a flexible arrangement of the antenna pedestal device, primarily at a different installation location than that at which the DVB-T receiver is situated. Particularly when the DVB-T receiver is situated at a less suitable location with regard to reception, the prior art forming the generic type opens up the possibility of installing the antenna at a more suitable location.

The technology herein, proceeding from this prior art forming the generic type, provides a further improvement which permits a DVB-T receiver to be used as optimally as possible.

The technology herein makes use of the insight that the modulation method OFDM employed in the DVB-T receiver is capable of multipath propagation. This permits provision of an active or passive indoor repeater. A passive indoor repeater may preferably be connected as a plug-on module to an antenna socket. Only in the case of an active indoor repeater does the latter generally also have a power supply connection not provided—which would be the exception—with a rechargeable electrical store (accumulator).

Furthermore, the indoor repeater according to exemplary illustrative non-limiting implementations could, however, also be connected directly to a coaxial cable which is provided from the conventional reception antenna—situated at a suitable location—for DVB-T receivers.

The indoor repeater could even be arranged in a manner concealed beneath a surface.

The repeater according to exemplary illustrative non-limiting implementations is independent of terminal equipment since the signals are not converted. Rather, it serves as a purely passive or active (that is to say amplifying) device by which the signals supplied via the antenna i.e. the coaxial cable, are merely radiated again (in passive operation) or are radiated in an amplified manner (in active operation).

BRIEF DESCRIPTION OF THE DRAWINGS

These and other features and advantages will be better and more completely understood by referring to the following detailed description in conjunction with the drawing which shows an exemplary illustrative non-limiting implementation.

DETAILED DESCRIPTION

Figure 1:
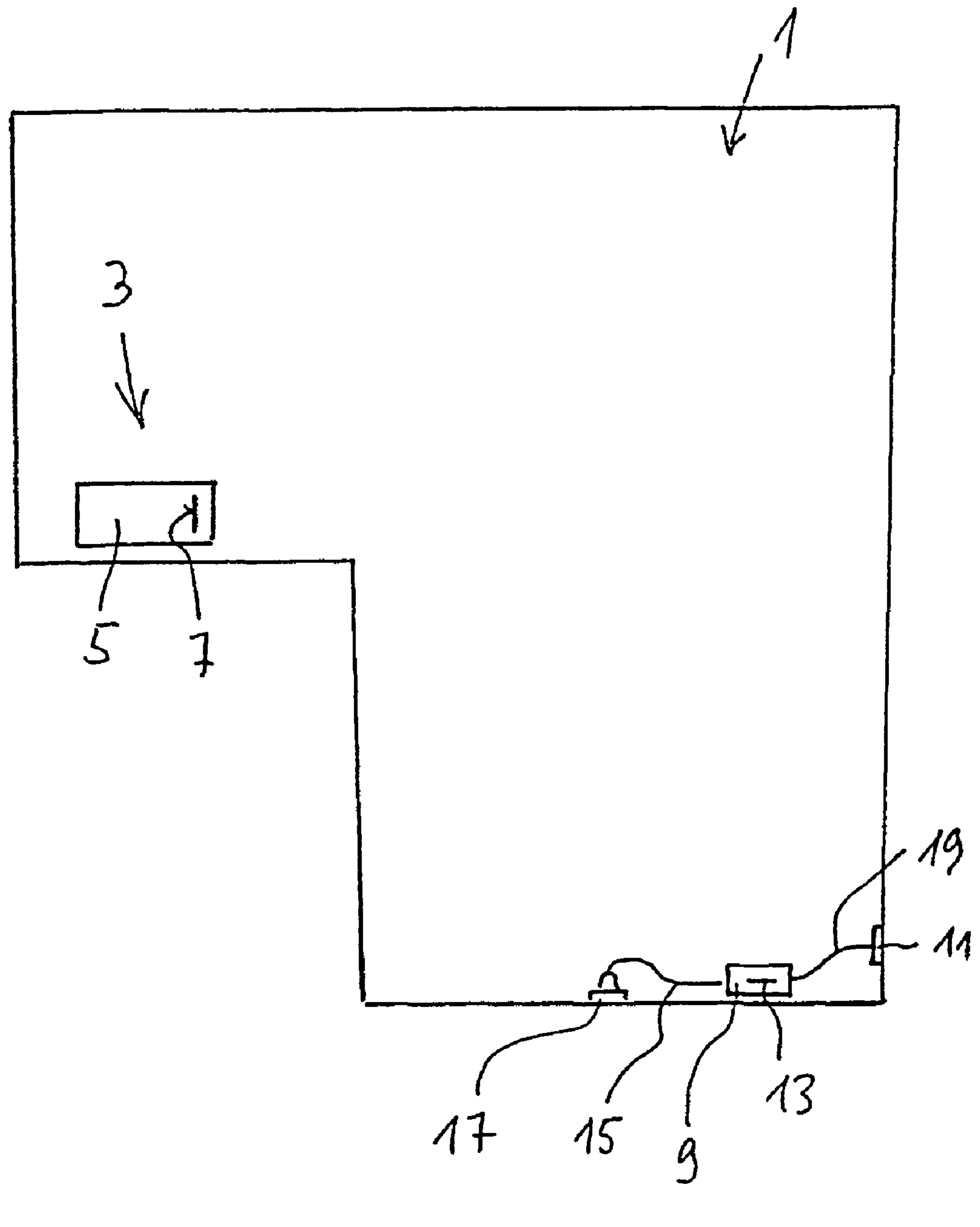

The FIGURE represents in plan view a room 1 in a building which, in cross section, has an L-shaped configuration, for example. A DVB-T receiver 5 for example for receiving terrestrially broadcast digitized programs is installed at a location 3 in the room in plan view. Said receiver is provided with a dedicated antenna 7 suitable for receiving the terrestrially digitized programs.

If the reception quality at the installation location is not optimal on account of specific conditions, then reception can be improved by using the exemplary illustrative non-limiting repeater 9.

The exemplary illustrative non-limiting repeater 9 is connected to a coaxial connection socket 11, for example. It has a dedicated, if appropriate integrated, antenna 13. In the exemplary illustrative non-limiting implementation shown, said repeater 9 is configured as an active repeater which is connected to an electrical power supply connection socket 17 via a dedicated power supply connection cable 15.

Said repeater contains, via a coaxial cable 19 connected to the connection socket 11, the digitized programs received terrestrially via an external antenna system (not specifically illustrated), amplifies said programs and emits them again via the dedicated integrated antenna 13. As a result, the reception quality is significantly improved at the installation location of the receiver.

The repeater 19 may equally well also be designed as a passive device. It may also or additionally be electrically connected directly to a coaxial cable (that is to say not via a connection socket as interface). In this case, it may even be accommodated in a flush concealed socket or chamber.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

The invention claimed is:

1. An extension apparatus for use with a DVB-T receiver, which comprises an antenna device, said extension apparatus comprising:

an indoor repeater including a repeater antenna device, digitized signals that are received and/or supplied to said indoor repeater-radiating or being radiated via said repeater antenna device, the indoor repeater comprising means for connection to a coaxial interface or a coaxial cable, and the indoor repeater comprising an individual antenna device via which transmission signals supplied via the coaxial interface or the coaxial cable can be radiated.

2. The extension apparatus as claimed in claim 1, wherein the repeater operates passively.

3. The extension apparatus as claimed in claim 1, wherein the repeater operates actively with generation of amplified radiation.

4. The extension apparatus as claimed in claim 1, wherein the repeater is accommodated or arranged in a manner concealed beneath a surface.

5. The extension apparatus as claimed in claim 1, wherein the repeater can be connected on a surface.

6. The extension apparatus as claimed in claim 1, wherein the repeater is connected to an antenna socket as a plug-on module.

7. The extension apparatus of claim 1 wherein the repeater is connected as a plug module to an antenna side of a coaxial cable.

8. An extension apparatus for a DVB-T receiver, comprising:

an indoor repeater in which received or supplied digitized signals can be radiated in a non-converted manner via an antenna device, wherein said indoor repeater can be accommodated in a manner concealed beneath a surface.

9. An indoor repeater for use with a DVB-T receiver having an antenna associated therewith, the indoor repeater comprising:

a connection to a coaxial interface or coaxial cable;

a repeater antenna coupled to said connection, said antenna radiating digitized DVB-T transmission signals supplied thereto via the coaxial interface or coaxial cable.

10. The indoor repeater of claim 9 wherein said repeater antenna is configured to be concealed beneath a surface.

11. The indoor repeater of claim 9 wherein said repeater further includes an amplifier coupled between said connection and said repeater antenna.

12. The indoor repeater of claim 9 wherein said repeater is passive.

* * * * *